United States Patent [19]
Gluck

[11] Patent Number: 6,152,434
[45] Date of Patent: Nov. 28, 2000

[54] SUPPORT

[76] Inventor: Rainer Gluck, Custenlohrstrasse 37, D-97215, Uffenheim, Germany

[21] Appl. No.: 09/155,046
[22] PCT Filed: Mar. 24, 1997
[86] PCT No.: PCT/DE97/00593
§ 371 Date: Nov. 23, 1998
§ 102(e) Date: Nov. 23, 1998
[87] PCT Pub. No.: WO97/36069
PCT Pub. Date: Oct. 2, 1997

[30] Foreign Application Priority Data

Mar. 22, 1996 [DE] Germany .................. 296 05 222 U

[51] Int. Cl.[7] .......................................... B25B 1/00
[52] U.S. Cl. ................ 269/6; 254/114; 254/116; 254/93 H
[58] Field of Search ..................... 254/106, 114, 254/116, 93 H; 269/6, 289 R; 414/11

[56] References Cited

U.S. PATENT DOCUMENTS

| | | |
|---|---|---|
| 3,930,645 | 1/1976 | Anderson . |
| 4,084,792 | 4/1978 | Baron et al. ............................. 254/106 |
| 4,641,815 | 2/1987 | Yu ......................................... 254/93 H |
| 4,695,028 | 9/1987 | Hunter . |
| 4,928,916 | 5/1990 | Molloy . |

FOREIGN PATENT DOCUMENTS

| | | |
|---|---|---|
| 0 404 745 | 12/1990 | European Pat. Off. . |
| 31 44 737 | 5/1983 | Germany . |
| 1 463 232 | 2/1977 | United Kingdom . |
| 2 161 139 | 1/1986 | United Kingdom . |

Primary Examiner—Timothy V. Eley
Assistant Examiner—Benjamin M. Halpern
Attorney, Agent, or Firm—Thomas C. McDonough

[57] ABSTRACT

The invention relates to a support for articles such as ceiling slabs, roof battens, machine parts or the like. The support comprises at least two telescopic tubes or one telescopic eod in at least one tube. A first tube or the rod can be displaced by a first distance in relation to the second tube, and devices are provided to convey the first tube or the rod a further distance in relation to the second tube. Stopping devices for the tube(s) and the rod are also provided in relation to each other and end stops are provided on the tubes, or the rod, the devices for further conveyance of the first tube or the rod comprising a ratchet, rack, clamping bracket or the like which are provided with manual advance devices.

16 Claims, 6 Drawing Sheets

SUPPORT

DESCRIPTION

The invention pertains to a holder for objects with the features described in claim 1.

A holder for objects such as ceiling tile, roof battens, machine parts or the like consisting of at least two telescoping pipes where a first pipe is shiftable in relation to the second pipe by a first distance and having a gas pressure spring to transport the first pipe in relation to the second pipe by a further distance and where an arrest device for the pipes against each other is wellknown (unpublished German patent application 195 29 989). With this holder, plaster tile can be held at the ceiling until they are fastened by screws or nails. In this instance, it is a disadvantage that the gas spring must be pressed against the held object in order to remove the holder and that the holding must be always be done with the same force.

It is the task of this invention to create a holder as described above that allows simple releasing and can be regulated in certain steps by the holding force.

This task is accomplished with the features described in claim 1.

Exemplary embodiments and advantages designs of the invention are comprised in the subsequent claims.

Under the invention, the means for the further transport of the first pipe consist of an advancing device such as a ratchet, a toothed rod, clamp holder or the like to be operated manually. The first pipe can also be a round, square or flat rod. For reasons of simplicity, two pipes are referenced in the following.

In a first embodiment of the invention, a gas pressure spring or a helical spring is arranged in and connected with the second pipe for the transport of the first pipe on the first distance. The first distance brings the stopper to contact the object to be held. The distance is then traversed as mentioned above by activating the advancing means; the distance is short and is intended for attaching the object at a ceiling, for example. To this end, a gripper is firmly attached to the upper end of the second pipe at or in which the advancing, holding and/or clamping means for the ratchet, toothed rod, clamp holder or the like are arranged.

In a first embodiment of the invention, a handle, a stopper or the like in compressed state can be mounted on the gripper for holding the gas pressure or screw spring. In this embodiment, the handle is first released, and the first pipe runs out of the second pipe up to the stopper. The further distance is then traversed, as described in the second embodiment of the invention, by activating the advancing means.

In another embodiment of the invention, the first pipe is first pulled by hand out of the second pipe and the gripper. The friction resistance of the clamping and holding device at the gripper must be overcome or annulled; the advancing devices are activated for the further transport.

It is advantageous when the end stoppers are plates on ball joints or the like. The plates should be removable and can be exchanged by other holding device such as grids or crosses. Other holding device attached to the first pipe can be used that prevent tipping or sloping of the ball joint.

In a preferred exemplary embodiment of the invention, the second pipe telescopes in a third pipe where devices exist to hold the two pipes against one another. The first pipe or the rod telescope in the second pipe where automatic devices for the first transport distance of the first pipe or the rod are arranged and where a hand activated gripper with clamping and advancing devices for a second transport device of the first pipe or the rod are mounted. In the preferred embodiment, the advancing device may be a device such as a ratchet, a toothed rod, clamp holder or the like. A gas pressure spring or helical spring is preferably located in and connected with the second pipe for the transport of the first pipe or the rod. In one embodiment the devices for a further transport of the first pipe or the rod are arranged at or in the second pipe.

In a third embodiment of the invention, a first spring loaded clamp holder for the first pipe or the rod is arranged in the second pipe which can be disengaged by a lever extending out of the pipe which causes the helical spring to relax and the first pipe or the rod to drive out. The helical spring is supported at its lower end by the second clamp holder on a stopper for the second pipe or the rod. The helical spring can be brought into a clamp position with a second lever and causes a step advance for the first pipe or the rod. In the ?entered position, the helical spring is tense, and the first clamp holder which is spring loaded from above, clamps the first pipe or the rod. When this clamp position is loosened by activation of a lever, the helical spring releases and drives out the first pipe or the rod via a carrier. Then, the second clamp holder is brought into the second clamp position with a second lever causing another smaller advance of the first pipe or the rod, respectively.

It is advantageous if the holder has a spring loaded length compensation. The length compensation is preferably a sheath extending over one end of the holder which affects a spring supported at the holder. The sheath is firmly connected at its end with the end stoppers.

Figure 1:
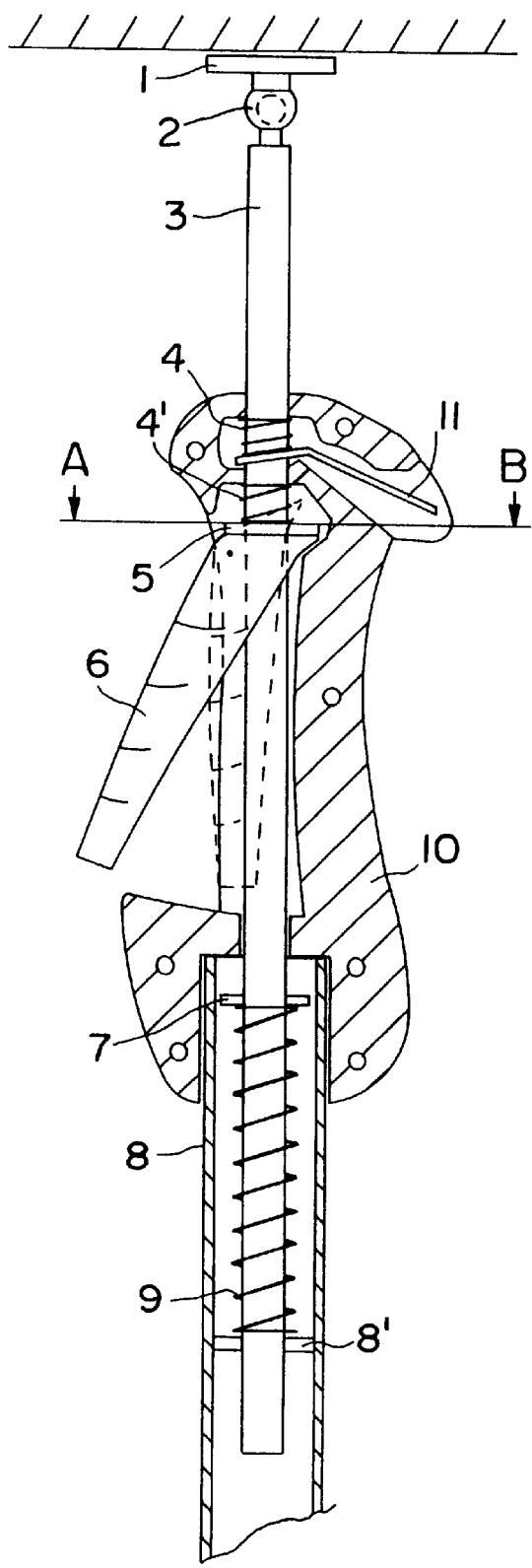
FIG. 1 shows a part of a first exemplary embodiment of the holder according to the invention.
Figure 2:
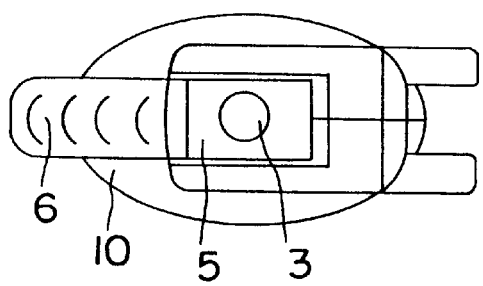
FIG. 2 shows a cut along the line A–B in FIG. 1.
Figure 3:
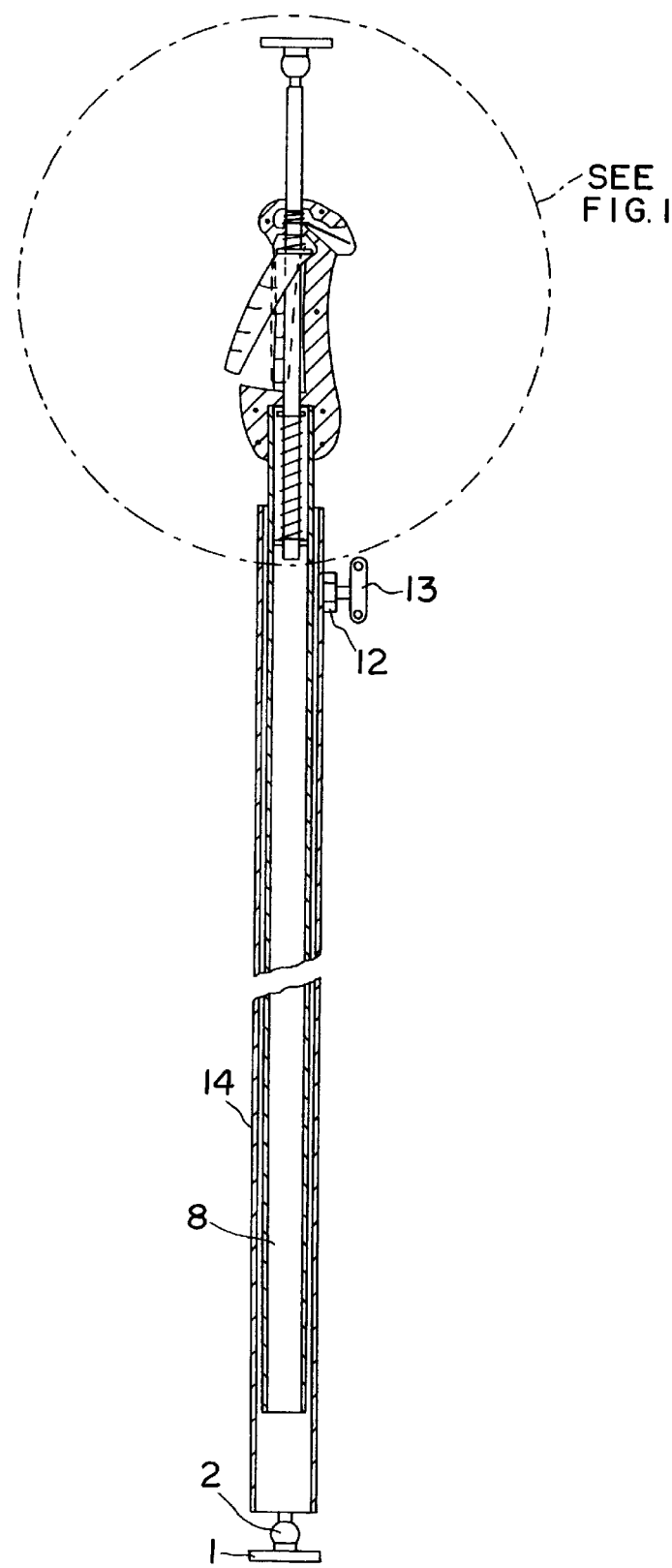
FIG. 3 shows the complete first exemplary embodiment of a holder.

The holder in FIGS. 1–3 consists of an outer third pipe 14 in which a second pipe 8 telescopes. Both are adjustable against each other with a wing nut 13 in a screw nut 12. As shown in FIG. 1, a rod 3 telescopes in the second pipe 8. The second pipe 8 has at its upper end a gripper 10 which is firmly connected with the rod 8. The gripper 10 has a recess for the rod 3 in which the rod can be axially shifted. The rod 3 sits on a helical spring 9 in the pipe 8 which is supported downward on a floor 8' in the pipe 8 and has a splint 7 as the upper stopper which is guided horizontally through a boring in the rod 3. At its upper area the gripper 10 has advancing and clamping devices for the rod 3. The advancing device consists of an advancing lever 6 located at the gripper in a lateral recess. On the advance lever 6 is a clamp plate 5 which has a boring for the rod 3 and which is loaded by a pressure spring 4' which is arranged around the rod 3 and is supported above the clamp plate 5 at the gripper 10. In the position shown in FIG. 1, the pressure spring 4' exerts pressure on the clamp plate 5 and thus the advancing lever 6 upward. The advance of rod 3 can only occur when the helical spring 9 or the splint 7, respectively, is not in an end position but, as shown in FIG. 1, below it. The advance is activated by pressing the advancing lever 6 inward which causes the clamp plate 5 to move into a diagonal position and to clamp the pipe 3 and to advance it one step upward. If the advance lever 6 is released, the clamp effect is annulled and the pressure spring 4' releases and presses the clamp plate 5 and the advancing lever 6 back in the initial position. The rod 3 is held in the attained position by a clamp lever 11 which is arranged in a recess for the advancing lever 6. The clamp lever 11 has a boring for the rod 3 and is located in the recess in a slanted position clamping the rod. The clamp lever is loaded by a second pressure spring 4 which is arranged around the rod 3 and supported in the gripper 10 above the clamp lever 11. In order to release the clamping action, the clamp lever must be swiveled against the force of the clamp lever 11 in the manner that the part of the clamp lever 11 which has the boring for the rod 3 reaches an approximate horizontal position and releases the rod. Then, the rod 3 can be moved back. The axial advance by the advancing lever 6 upward overcomes the friction of the clamp lever 11 during the advance step. As shown in FIG. 1, the holder has at both its ends, i.e., at the first pipe 14 and at the rod 3, ball joints 2 on which support plates are arranged cardanically. The function is performed in the manner that the second pipe 8 is pre-adjusted in relation to the third pipe 14 so that the rod 3 drives out when the helical spring 9 is released and the plate 1 abuts at the ceiling. Then the plate is pressed with the desired force against the ceiling by activating the advancing lever 6. The advance can be minimal.

Figure 4:
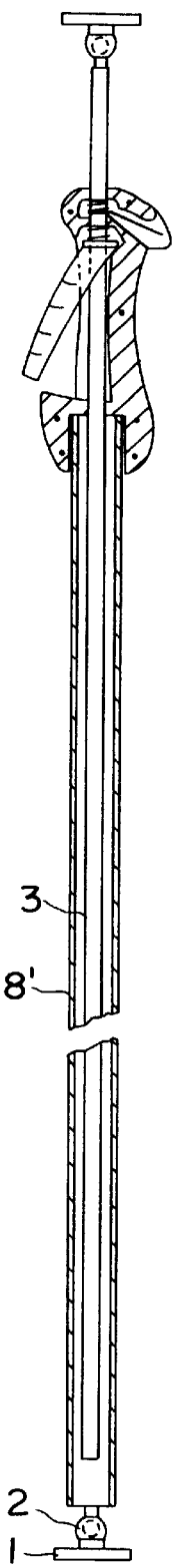
FIG. 4 shows a second exemplary embodiment of a holder according to the invention.

FIG. 4 shows a second exemplary embodiment of the invention which is similar to the first in the area of the step advance but which has no third pipe; the rod 3 extends further downward in the pipe 8' without spring loading.

Figure 5:
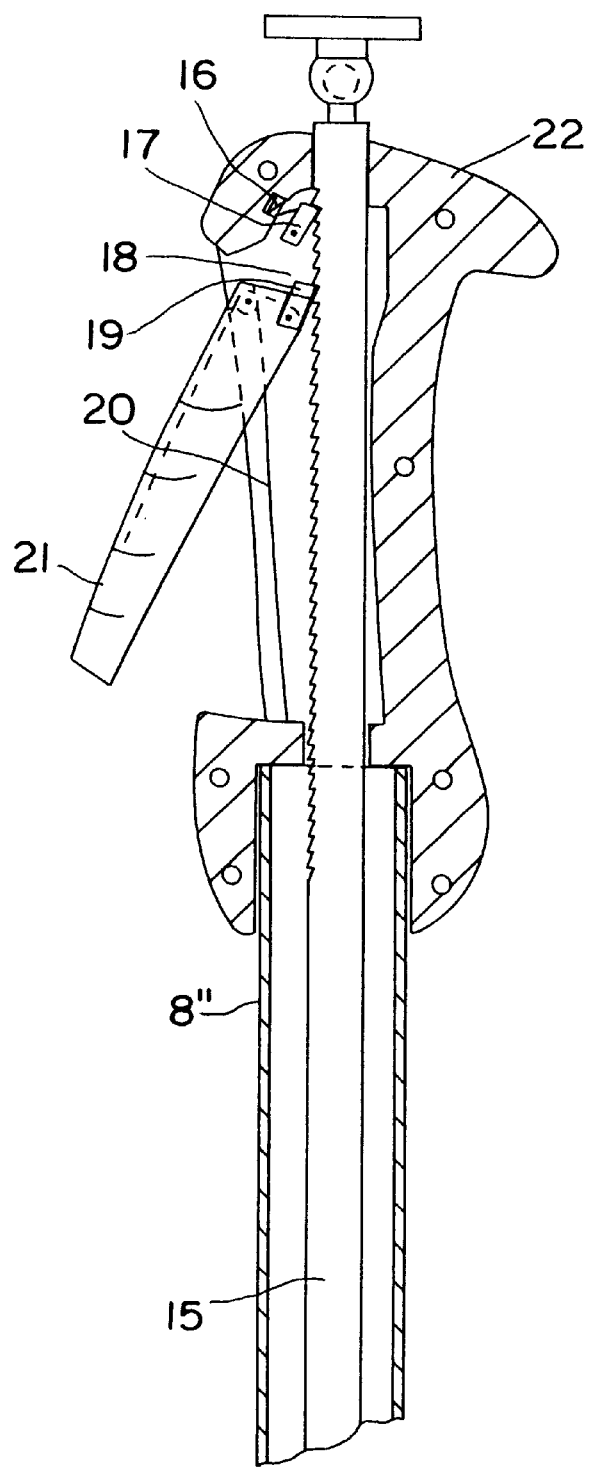
FIG. 5 shows a part of a third exemplary embodiment of a holder according to the invention.

FIG. 5 shows an alternative embodiment of the gripper 22 with the step advance for the rod 15 which is designed here as a toothed rod with teeth pointing diagonally downward. Here, too, is an advance lever 21 which is located in a recess of the gripper 22 connected with the pipe 8". The advance lever is pressed outward by a leg spring 20 which is laterally supported by the gripper 22 and has at its upper end an advance tooth 19 that abuts the upright flank of a tooth on the toothed rod. When the advance lever 21 is pressed inward, the advance tooth pushes the toothed rod 15 upward. The toothed rod 15 is held in this position by a resting tooth 17 which presses radially against the toothed rod, loaded by a pressure spring 16 located in the gripper 22 and which abuts to the upright tooth in the toothed rod 15. In this exemplary embodiment the rod 15 is initially pulled out manually before the advance lever 21 is activated for the last piece of the distance or to clamp the object to be held. To push the toothed rod 15 it must be turned so far that the advance tooth 19 does not mesh with the teeth of the toothed rod 15.

Figure 6:
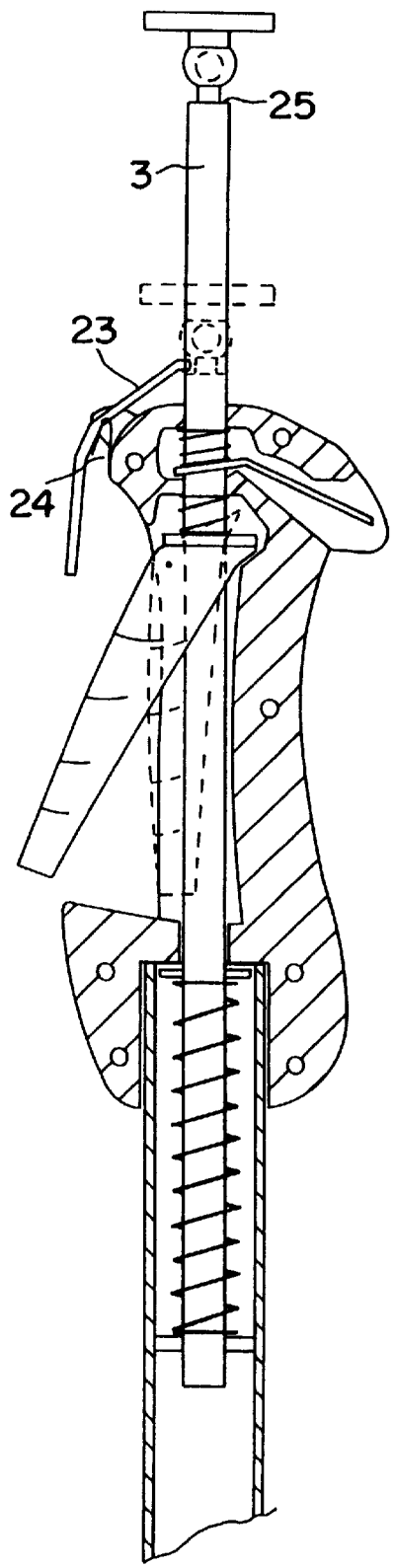
FIG. 6 shows a part a fourth exemplary embodiment of a holder according to the invention.

FIG. 6 shows a gripper like in FIG. 1, but this one has a ratchet 23 which keeps the rod 3 at its upper rim 25 in a retracted position. The ratchet 23 can be released by pressing on key 24.

Figure 7:
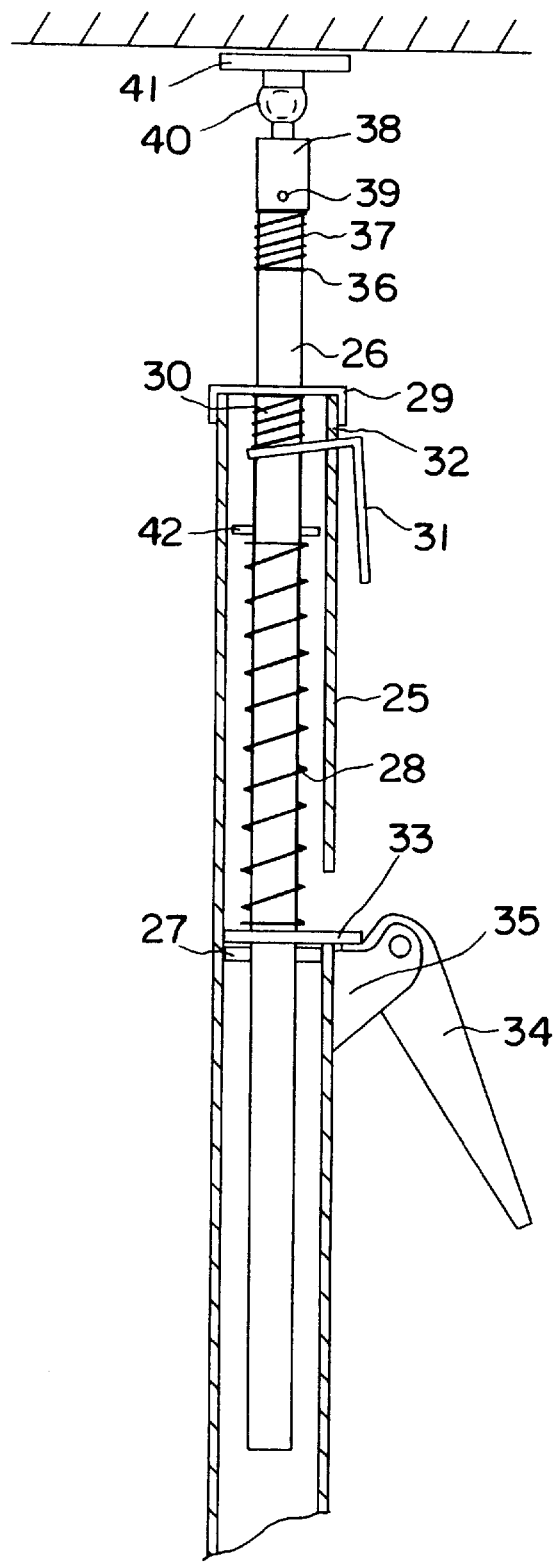
FIG. 7 shows a third exemplary embodiment the holder according to the invention.

FIG. 7 shows a third embodiment of the holder. Here a rod 26, as in the other exemplary embodiments, telescopes in a pipe 25. The mechanism for the first and second transport distance is located completely in a second pipe 25, and the separate gripper is not needed. In the second pipe 25 is a supporting stopper 27 in which a clamp plate is located on which, in turn, the screw spring 28 is supported enabling the further transport distance of the rod 26. To this end, the rod 26 has a splint 42 or the like in the interior of the pipe 25. Before using the holder, the rod 25 is pushed into the pipe 25 and the screw spring 28 is compressed. The rod 26 is held in this position by a clamp lever 31 against the force of the spring 28. The clamp lever 31 has a boring in the familiar manner and clamps and abuts the rod 26 in the diagonal position as shown. The clamp lever 31 is held in this position by a screw spring 30 which supports itself at an extrusion 29 of the rod 29 on top and works from above on the clamp lever. The clamping force used here is higher than the opposing force of the screw spring 28. The clamp lever 31 is extended outward and can be manually brought in a straight position around a swivel point against the force of the spring 30 where the clamp action is annulled because the boring of the clamp lever is designed in the manner that it no longer abuts and clamps the rod 26. Now the screw spring 28 relaxes and drives the rod 26 out by the first transport distance. The lower clamp plate 33 which functions in the same manner as the clamp lever 31 no longer abuts and clamps on the support stopper. The clamp plate 33 is arranged outward out of the pipe and rests on a nose of the lever 34 attached as a swivel at the pipe 35. When the lever 34 is pressed toward the pipe 25, the nose moves upward and the clamp plate is moved into the slant position in which it abuts at the rod 26 and clamps. By further moving the lever 34 toward the pipe 25, the rod 26 is, depending on the nose design, transported upward another much shorter distance. In this, the force of the upper spring 30 must be overcome which holds the rod 26 in the advanced position after the lever 34 is released. In this embodiment, the second pipe 25 can telescope in a third pipe and be arrested and pre-set.

In this third embodiment, an additional length compensation is shown which can also be utilized in the other embodiments. It is intended to compensate, for example, for slight slants in the floor. The length compensation consists of a sheath 38 which is placed over the end of rod 26. The sheath 38 is loaded by a spring 37 which is supported by a splint 36 or the like in the rod 26. The sheath 38 carries at its closed end the ball joint 40 with the plate 41. The sheath 38 is secured with a pin 39. If the floor slants, the spring 37 releases and presses the sheath 38 upward.

What is claimed is:

1. A holder comprising:
   at least two telescoping pipes, wherein a first pipe of the two telescoping pipes is movable a first distance relative to a second pipe of the two telescoping pipes;
   transport means for moving the first pipe relative to the second pipe the first distance, wherein the transport means comprises a spring connected to the first pipe and the second pipe for transporting the first pipe relative to the second pipe, and wherein the spring is aligned with an axis of the second pipe; and the holder further comprising
   advancing means for moving the first pipe a further distance relative to the second pipe.

2. The holder of claim 1, wherein the first pipe is a rod telescopically shiftable within the second pipe.

3. The holder of claim 1, wherein the spring is a gas pressurized spring.

4. The holder of claim 1, wherein the spring is a helical spring.

5. The holder of claim 1, wherein the spring is located in and connected to the second pipe, and wherein the advancing device includes a second spring generally aligned with the axis of the second pipe.

6. The holder according to claim 1, wherein the advancing means is located in the second pipe.

7. A holder comprising:
   at least two telescoping pipes, wherein a first pipe and a second pipe of the at least two telescoping pipes have respective upper ends, the second pipe has a lower end, and the first pipe is shiftable in relation to the second pipe by a first distance;
   a transport device for transporting the first pipe in relation to the second pipe by the first distance; and
   an advancing device for moving the second pipe a further distance relative to the first pipe, wherein the advancing device includes:
      a first spring loaded clamp holder located in the upper end of the second pipe and holding the first pipe;
      a second clamp holder located below the first clamp holder and connected to the second pipe;
      a first lever extending from the second pipe and providing means for loosening the first clamp holder; and
      a second lever operably positioned to place the second clamp holder in a clamping position, wherein the first pipe is capable of being advanced stepwise relative to the second pipe.

8. The holder of claim 1, where the spring has a spring loaded length compensation device.

9. A holder comprising:
   at least two telescoping pipes, wherein a first pipe and a second pipe of the two telescoping pipes have respective upper ends, the second pipe has a lower end, and the first pipe is shiftable in relation to the second pipe by a first distance;
   a transport device for transporting the first pipe in relation to the second pipe by the first distance;
   a first stopper connected to the first pipe upper end;
   a second stopper positioned to suport the second pipe lower end;
   an advancing device for moving the second pipe a further distance relative to the first pipe; and
   a sheath connecting the first pipe upper end with the first stopper, wherein the transport device includes a length compensation device having a load spring operably supported by the sheath and the first pipe upper end.

10. A holder comprising:
    at least two telescoping pipes, wherein a first pipe of the two telescoping pipes is movable a first distance relative to a second pipe of the two telescoping pipes, wherein the second pipe comprise an upper end; a handle connected to the upper end of the second pipe;
    transport means for moving the first pipe relative to the second pipe the first distance; and
    advancing means for moving the first pipe a further distance relative to the second pipe, wherein the advancing device is operatively located at the handle.

11. The holder of claim 10, wherein the transport means comprises a spring, and wherein the holder comprising a latch operatively located at the handle to hold the spring in a compressed state.

12. A holder comprising:
    at least two telescoping pipes, wherein a first pipe and a second pipe of the two telescoping pipes have respective upper ends, the second pipe has a lower end, and the first pipe is shiftable in relation to the second pipe by a first distance;
    a transport device for transporting the first pipe in relation to the second pipe by the first distance;
    a first stopper connected to the first pipe upper end, wherein the first stopper comprises a first plate connected to the first pipe upper end via a first joint;
    a second stopper positioned to support the second pipe lower end, wherein the second stopper comprises a second plate connected to the second pipe lower end via a second joint; and
    an advancing device for moving the second pipe a further distance relative to the first pipe.

13. The holder of claim 12, wherein the first and second plates are removable.

14. A holder comprising:
    at least two telescoping pipes, wherein a first pipe of the two telescoping pipes is movable a first distance relative to a second pipe of the two telescoping pipes;
    transport means for moving the first pipe relative to the second pipe the first distance;
    advancing means for moving the first pipe a further distance relative to the second pipe;
    a third pipe, wherein the second pipe telescopes inside the third pipe;
    means for fixing the second pipe relative to the third pipe while allowing the first pipe to telescope inside the second pipe;
    the transport means including automatic means located in the second pipe for transporting for the first pipe in the second pipe; and
    the advancing means including a hand operated handle having a clamping and advancing device located at the upper end of the second pipe for advancing the first pipe relative to the second pipe the further distance.

15. The holder of claim 9 wherein the advancing means is adapted to advance the first pipe relative to the second pipe stepwise.

16. A holder comprising:
    at least two telescoping pipes, wherein a first pipe of the two telescoping pipes is movable a first distance relative to a second pipe of the two telescoping pipes;
    transport means for moving the first pipe relative to the second pipe the first distance; and
    advancing means for moving the first pipe a further distance relative to the second pipe, wherein the advancing means comprises a ratcheting device connected to the first pipe and the second pipe.

* * * * *